US 9,390,477 B2

(12) United States Patent
Watanabe (10) Patent No.: US 9,390,477 B2
(45) Date of Patent: Jul. 12, 2016

(54) IMAGE PROCESSING APPARATUS, IMAGE PICKUP APPARATUS, IMAGE PROCESSING METHOD, AND NON-TRANSITORY COMPUTER-READABLE STORAGE MEDIUM FOR IMAGE RESTORATION USING BLIND DECONVOLUTION

(71) Applicant: CANON KABUSHIKI KAISHA, Tokyo (JP)

(72) Inventor: Takeshi Watanabe, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 56 days.

(21) Appl. No.: 14/165,739

(22) Filed: Jan. 28, 2014

(65) Prior Publication Data

US 2014/0211038 A1 Jul. 31, 2014

(30) Foreign Application Priority Data

Jan. 28, 2013 (JP) .................................. 2013-013226

(51) Int. Cl.
*G06T 5/00* (2006.01)
*G01M 11/00* (2006.01)

(52) U.S. Cl.
CPC .............. *G06T 5/001* (2013.01); *G01M 11/00* (2013.01); *G06T 5/003* (2013.01)

(58) Field of Classification Search
CPC ................................ G06T 5/001; G06T 5/003
See application file for complete search history.

(56) References Cited

U.S. PATENT DOCUMENTS

| 8,019,803 | B2 | 9/2011 | Eguchi et al. | |
|---|---|---|---|---|
| 8,049,798 | B2 | 11/2011 | Hayashi | |
| 8,249,357 | B2* | 8/2012 | Yitzhaky et al. | 382/199 |
| 2005/0088745 | A1* | 4/2005 | Cathey et al. | 359/568 |
| 2009/0252430 | A1* | 10/2009 | Hou et al. | 382/254 |
| 2011/0097009 | A1 | 4/2011 | Chouly | |
| 2012/0154626 | A1* | 6/2012 | Hatakeyama et al. | 348/223.1 |
| 2012/0288212 | A1* | 11/2012 | Arrasmith | H04N 5/225 382/260 |
| 2013/0222615 | A1* | 8/2013 | Arrasmith | G06T 5/003 348/207.1 |
| 2014/0205166 | A1* | 7/2014 | Benameur et al. | 382/131 |

(Continued)

FOREIGN PATENT DOCUMENTS

| CN | 102708543 A | 10/2012 |
|---|---|---|
| JP | 2007-306548 A | 11/2007 |
| JP | 2011-166588 A | 8/2011 |

(Continued)

OTHER PUBLICATIONS

William Hadley Richardson; "Bayesian-Based Iterative Method of Image Restoration"; Journal of the Optical Society of America; vol. 62, No. 1; Jan. 1972; pp. 55-59.

(Continued)

*Primary Examiner* — Shahbaz Nazrul
(74) *Attorney, Agent, or Firm* — Rossi, Kimms & McDowell LLP (57) ABSTRACT

An image processing apparatus (804) includes a function obtaining portion (804a) configured to obtain a first optical transfer function which is different depending on a shooting condition and on a position in an image, a corrected image generating portion (804b) configured to generate a corrected image from the image using the first optical transfer function, and an image restoration portion (804c) configured to perform blind deconvolution processing using the corrected image to generate a restored image.

12 Claims, 7 Drawing Sheets

(56) References Cited

U.S. PATENT DOCUMENTS

2014/0348441 A1* 11/2014 Tezaur .................. 382/255
2014/0355901 A1* 12/2014 Tezaur .................. 382/255

FOREIGN PATENT DOCUMENTS

| | | |
|---|---|---|
| JP | 2012-003454 A | 1/2012 |
| WO | 2006041127 A1 | 4/2006 |
| WO | 2007/074649 A1 | 7/2007 |
| WO | 2009153717 A2 | 12/2009 |

OTHER PUBLICATIONS

Fish, et al; "Blind deconvolution by means of the Richardson-Lucy algorithm"; Journal Optical Society of America; A/ vol. 12, No. 1/Jan. 1995; pp. 58-74.

Office Action issued in Chinese Appln. No. 201410032682.4 mailed Mar. 24, 2016. English translation provided.

Extended European Search Report issued in European Appln. No. 14000252.8 mailed May 30, 2016.

Hashimoto et al. "Restoration of Shift Variant Blurred Image Estimating the Parameter Distribution of Point-Spread Function." Systems and Computers in Japan. 1995: 62-72 vol. 26, No. 1. Cited in NPL 1.

Loyev et al. "Initialization of iterative parametric algorithms for blind deconvolution of motion-blurred images." Applied Optics. Apr. 10, 2006: 2444-2452. vol. 45, No. 11. Cited in NPL 1.

Cannell et al. "Image Enhancement by Deconvolution." Handbook of Biological Confocal Microscopy. 2006: 488-500. Third Edition. Cited in NPL 1.

* cited by examiner

FIRST DETERIORATION CHARACTERISTICS (PSF)

SECOND DETERIORATION CHARACTERISTICS (PSF)

IMAGE PROCESSING APPARATUS, IMAGE PICKUP APPARATUS, IMAGE PROCESSING METHOD, AND NON-TRANSITORY COMPUTER-READABLE STORAGE MEDIUM FOR IMAGE RESTORATION USING BLIND DECONVOLUTION

BACKGROUND OF THE INVENTION

1. Field of the Invention

The present invention relates to an image processing apparatus which performs image restoration.

2. Description of the Related Art

An object shot via an image pickup optical system suffers from diffraction, aberration, and other adverse effects which occur in the image pickup optical system. These adverse effects make it impossible for light emitted from one point to converge to another point, which causes the light to be minutely spread around the another point. Such a minutely-spread distribution is referred to as point spread function (PSF). Such adverse effects which occur in the image pickup optical system cause a shot image to be formed, with the PSF being convoluted with the image. This makes the image blurry, leading to a decrease in resolution.

With the retention of a shot image as electronic data having become common in recent years, image restoration processing in which a deterioration of an image caused by an optical system is corrected by using image processing has been proposed. As the image restoration processing, for example, image restoration processing by using the Wiener filter is known. An image shot by a typical digital camera has different deterioration characteristics depending on its position (image height). In many cases, an amount of the aberration of the image pickup optical system is large and the aberration is asymmetrically deteriorated at the periphery of the shot image.

International Publication No. WO 2007/74649 discloses a system where a phase mask that modulates a wavefront is inserted near a position of an aperture of an image pickup optical system. If an image as a whole has certain deterioration characteristics and has frequency characteristics including no zero point, the image can be easily restored with the use of the Wiener filer. The system disclosed in International Publication No. WO 2007/74649, however, requires a special optical design in which a phase mask is inserted. This design makes it difficult to apply this system to a typical digital camera.

Both of International Publication WO 2006/041127 and the literature "OSA VOLUME 62, NUMBER 1 JANUARY 1972 Bayesian-Based Iterative Method of Image Restoration" disclose a method of performing blind deconvolution processing with the use of the so-called Lucy-Richardson method (the LR method). The literature "J. Opt. Soc. Am. A/Vol. 12, No. 1/January 1995 Blind deconvolution by means of the Richardson-Lucy algorithm" discloses blind deconvolution processing in which image restoration processing can be performed while estimating deterioration characteristics even if a shot image is only known information. However, if the shot image has shift-variant deterioration characteristics, it is difficult to satisfactorily restore, with conventional arts, the image in frequency regions in which an optical transfer function has a value close to zero.

SUMMARY OF THE INVENTION

The present invention provides an image processing apparatus, an image pickup apparatus, an image processing method, and a non-transitory computer-readable storage medium which are capable of satisfactorily restoring an image even in a frequency region where information is lost due to deterioration characteristics.

An image processing apparatus as an aspect of the present invention includes a function obtaining portion configured to obtain a first optical transfer function which is different depending on a shooting condition and on a position in an image, a corrected image generating portion configured to generate a corrected image from the image using the first optical transfer function, and an image restoration portion configured to perform blind deconvolution processing using the corrected image to generate a restored image.

An image pickup apparatus as another aspect of the present invention includes an image pickup element configured to photoelectrically convert an object image via an image pickup optical system, a function obtaining portion configured to obtain a first optical transfer function which is different depending on a shooting condition and on a position in an image, a corrected image generating portion configured to generate a corrected image from the image using the first optical transfer function, and an image restoration portion configured to perform blind deconvolution processing using the corrected image to generate a restored image.

A method of processing an image as another aspect of the present invention includes the steps of obtaining a first optical transfer function which is different depending on a shooting condition and on a position in an image, generating a corrected image from the image using the first optical transfer function, and performing blind deconvolution processing using the corrected image to generate a restored image.

A non-transitory computer-readable storage medium as another aspect of the present invention stores the image processing program.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings. In each of the drawings, the same elements will be denoted by the same reference numerals and the duplicate descriptions thereof will be omitted.

First of all, an outline of an image processing method (image restoration processing) in this embodiment will be described. The following Expression (1) is satisfied where, in a real space, f(x,y) is an image which is not deteriorated by an optical system, h(x,y) is the PSF (point spread function), and g(x,y) is an image which is deteriorated.

$$g(x,y) = \iint f(X,Y) * h(x-X, y-Y) dXdY \qquad (1)$$

When the Fourier transform is performed for Expression (1) to convert the real space (x,y) to a frequency space (u,v), the following Expression (2) is satisfied.

$$G(u,v) = F(u,v) * H(u,v) \qquad (2)$$

In Expression (2), F(u,v) is a result of the Fourier transform of f(x,y), G(u,v) is a result of the Fourier transform of g(x,y), and H(u,v) is a result of the Fourier transform of h(x,y). Therefore, the following Expression (3) is satisfied.

$$F(u,v) = G(u,v)/H(u,v) \qquad (3)$$

Expression (3) means that the result F(u,v) of the Fourier transform of the image f(x,y) which is not deteriorated can be obtained by dividing the result G(u,v) of the Fourier transform of the deteriorated image g(x,y) in the frequency space by the result H(u,v) of the Fourier transform of the point spread function h(x,y). Therefore, the image f(x,y) which is not deteriorated can be obtained by performing the reverse Fourier transform for F(u,v).

Actually, however, if such processing is performed to obtain an image which is not deteriorated, a noise caused by an image pickup element is amplified and ringing is highly likely to occur on the image. Thus, it is difficult to obtain a satisfactory image with the division by simple reverse characteristics.

As a method of restoring an image to suppress the amplification of the noise, the use of Wiener filter W(u,v) represented by the following Expression (4).

$$W(u,v) = 1/H(u,v) * |H(u,v)|^2/(|H(u,v)|^2 + \Gamma) \qquad (4)$$

In Expression (4), symbol H(u,v) denotes an optical transfer function (an OTF), and symbol $\Gamma$ denotes a constant to reduce an amount of the noise amplification.

The multiplication of W(u,v) represented by Expression (4) by the result G(u,v) of the Fourier transform of the deteriorated image g(x,y) allows a phase component of the PSF caused due to the diffraction or the aberration that occurs in the optical system to have a value of zero and frequency characteristics of an amplitude component are amplified. This makes it possible to obtain a high-resolution and satisfactory image. That is, the following Expression (5) is satisfied where R(u,v) is frequency space information of an image restored by the image restoration processing using the Wiener filter.

$$R(u,v) = G(u,v) * W(u,v) \qquad (5)$$

The largest advantage of the image restoration processing using the Wiener filter is that the restoration processing can be easily performed with respect to the deterioration characteristics such as the PSF which varies depending on each position in a space. This is called "shift-variant".

First, Expression (1) which represents a model of the deterioration caused by the optical system will be explained. In Expression (1), h(x,y), that is the PSF does not vary. This is called "shift-invariant". Assuming that h varies on each coordinate point (x,y), Expression (1) is applied to a shift-variant case. In this situation, the division of each shift-invariant region into fine regions, each of which is equivalent to one pixel, has the same effect with a fully shift-variant processing. However, if each divided region is determined depending on the deterioration characteristics in an appropriate range, it is possible to achieve a sufficient effect as a shift-variant processing. The sufficient effect can also be achieved even when an image restoration filter is designed for each representative point on an image and an approximation is performed by interpolating and generating the filters of the representative points for regions between the representative points.

Accordingly, each region on the image is finely divided to set regions in which Expression (1) is satisfied, and subsequently an image restoration filter in a frequency space is designed with the use of Expression (4). Then, the reverse Fourier transform is performed for the image restoration filter to be converted to an image restoration filter in a real space. Finally, a filtering is performed for each divided region by using the image restoration filter on the real space, and thus the shift-variant image restoration processing can be easily achieved.

Another advantage is low calculation cost. With the significantly growing number of pixels of an image pickup element in recent years, the calculation cost required for the image processing can be considered as a very important issue. This means that a super computer is required for performing the image processing with tens of millions of pixels in a practical period of time although it is possible to theoretically perform the image processing. The Wiener filter is a filter optimized as a least squares solution, which requires a very small amount of calculation cost, enabling performance of the high speed image restoration processing even with a home PC.

However, if a value in the frequency space of the optical transfer function H(u,v) is close to zero (zero or an extremely small value), a substantial restoration effect cannot be achieved in the frequency region with the Wiener filter. In addition, the Wiener filter, in fact, is prone to suffer from ringing or unnatural undershoot, which is detrimental to an image (a detrimental effect). Furthermore, it is sometimes difficult to correctly obtain an optical transfer function group with the Wiener filter according to a shooting condition, and thus an error generated when obtaining the shooting condition may also cause the detrimental effect described above.

In order to overcome the detrimental effect, in this embodiment, image restoration processing by using the so-called Lucy-Richardson method (the LR method) is performed. Different from image restoration processing with the use of the Wiener filter, the image restoration processing by the LR method is not a method involving a division as represented by Expression (4). In the LR method, the image restoration processing is performed with the use of the Bayes estimation. Different from the image restoration processing with the use of the Wiener filter, the LR method can estimate and reconstruct (restore) lost frequency information as well. Therefore, this method is effective for a region in which a frequency component is zero.

The image restoration processing by the LR method is represented by the following Expression (6) in the real space. The details such as the relationship with the Bayes estimation, which is the principle of the image restoration processing by the LR method, are described in the literature "OSA VOLUME 62, NUMBER 1 JANUARY 1972 Bayesian-Based Iterative Method of Image Restoration".

$$f_n(x,y) \leftarrow f_{n-1}(x,y) \iint \frac{h(X-x, Y-y) \cdot g(X,Y)}{\iint h(X-s, Y-t) \cdot f_{n-1}(s,t) dsdt} dXdY \qquad (6)$$

In Expression (6), symbol $f_n$ is an image which is updated, and symbol $f_{n-1}$ an image which is not updated. Symbol h is the deterioration characteristics of the optical system, e.g. the PSF. Symbol g is a shot image.

In the image restoration processing by the LR method, the image $f_{n-1}$ is sequentially updated until the processing is discontinued according to, for example, a predetermined evaluation criterion, and then the image $f_n$ is output. The evaluation criterion for the processing includes, for example, a difference value between $f_n$ and $f_{n-1}$. If the degree of the deterioration of the shot image g is small, it is preferable that $f_0$ is equal to g ($f_0$=g). However, if the degree of the deterioration of the shot image g is large, a satisfactory image restoration cannot be expected even when $f_0$ is equal to g ($f_0$=g).

In the image restoration processing by the LR method, image restoration processing by super-resolution processing based on the principle of the Bayes estimation can be performed in a region in which a frequency component has a value of zero or a value close to zero. However, since the restoration processing algorithm used in the processing is a repeated calculation in a shift-invariant region, the calculation cost is increased. In particular, the larger the degree of the deterioration of an image used as an initial value $f_0$ (an initial condition), the greater the degree of the deviation from the principle of the LR method is. This greater degree of the deviation makes it difficult to satisfactorily restore the image. Moreover, the larger degree of the deterioration of the initial value $f_0$ causes a calculation time required until the completion of the image restoration processing. Generally, the restoration effect brought by the LR method increases with the increase in the number of repetitions, but the detrimental effect is also enlarged at the same time.

In this embodiment, blind deconvolution processing is adopted in which image restoration processing is performed while estimating deterioration characteristics even if a shot image is only known information. As disclosed in the literature "J. Opt. Soc. Am. A/Vol. 12, No. 1/January 1995 Blind deconvolution by means of the Richardson-Lucy algorithm", where deterioration characteristics h are unknown and the image f is known, the deterioration characteristics h are estimated with the LR method by sequentially updating the $f_n$. More specifically, deterioration characteristics $h_n$ are reconstructed (restored) by the processing represented as the following Expression (7).

$$h_n(x, y) \leftarrow h_{n-1}(x, y) \int\int \frac{f(X-x, Y-y) \cdot g(X, Y)}{\int\int f(X-s, Y-t) \cdot h_{n-1}(s, t) ds dt} dX dY \quad (7)$$

Therefore, the combination of Expression (6) and Expression (7) makes it possible to perform the image restoration processing through the sequential updating of the image $f_n$ and the deterioration characteristics $h_n$. While the blind deconvolution processing by the LR method is described in this embodiment, applicable approaches are not limited to this. For instance, the Iterative-Backprojection method (IBP method) or the Ayers-Danity algorithm can also be adopted.

Embodiment 1

Figure 1:
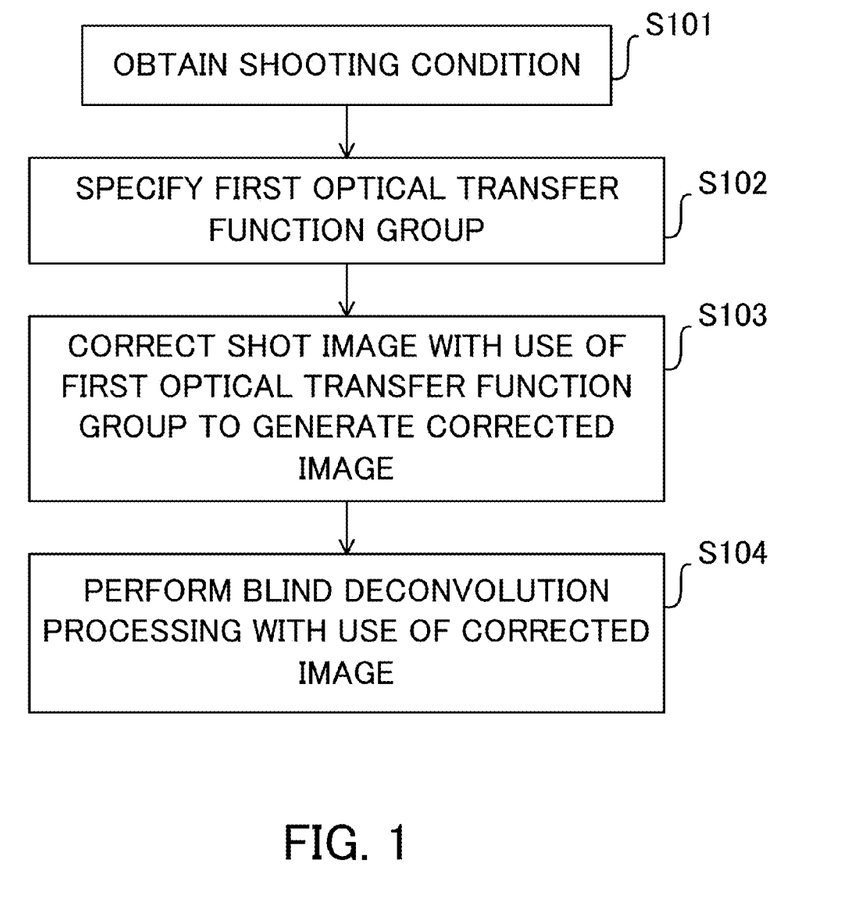
FIG. 1 is a flowchart of an image processing method (image restoration processing) in Embodiment 1.

Next, referring to FIGS. 1 and 2A to 2E, an image processing method (image restoration processing) in Embodiment 1 of the present invention will be described. FIG. 1 is a flowchart of the image processing method in this embodiment. FIGS. 2A to 2E are explanatory diagrams of a corrected image in this embodiment. The image processing method in this embodiment is performed by an image processing unit (image processor) provided in an image processing apparatus or an image pickup apparatus.

Figure 2A:
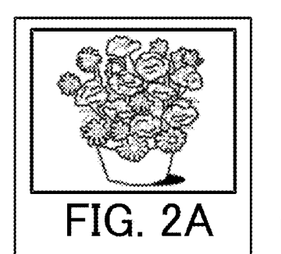
FIGS. 2A to 2E are explanatory diagrams of a corrected image in Embodiment 1.
Figure 2B:
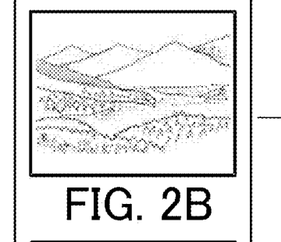
Figure 2C:
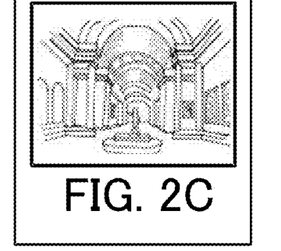

First, at step S101, the image processing unit specifies an image (a shot image) to be restored, and then obtain a shooting condition of the image. In this embodiment, the shooting condition means at least one of various parameters (optical parameters) when shooting the image, which includes, for example, a focal length, an F number (an aperture value), an object distance, an image height, information on an image pickup element (a pixel size and a pixel pitch), information on an optical low-pass filter, and information on an image pickup optical system (a lens). FIGS. 2A to 2C illustrate images shot in different shooting conditions from each other. The shooting condition is attached to each of the images illustrated in FIGS. 2A to 2C. The image processing unit is capable of specifying the shooting condition based on information (information on the shooting condition) attached to an image.

Subsequently, at step S102, the image processing unit specifies (generates) a first optical transfer function group corresponding to the shooting condition obtained at step S101. The first optical transfer function group includes a plurality of optical transfer functions OTFs (first optical transfer functions) depending on a position in the image (an image height position). As described above, in this embodiment, the image processing unit (a function obtaining portion 804a) obtains the first optical transfer functions (the first optical transfer function group) which are different depending on the shooting condition and the position in the image (the image height position).

Figure 2D:
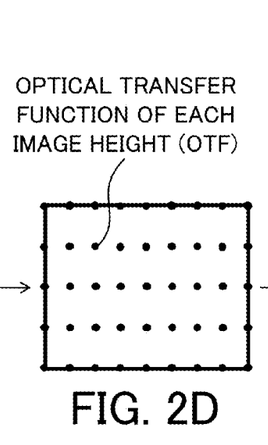

The image processing unit is capable of obtaining the optical transfer function OTF for each position of a pixel point. However, it is sometimes impracticable to calculate the equivalent number of the optical transfer functions as that of pixels in view of the amount and time of calculation. Thus, it is preferable in this embodiment that, as illustrated in FIG. 2D, the image processing unit specifies the representative point of the image height and then obtains the optical transfer function OTF for each representative image height (for each representative point position). Alternatively, the image processing unit may divide the image into a plurality of regions to obtain an optical transfer function OTF for each divided region. In this processing, it is preferable to define each representative point position or each divided region to prevent optical characteristics from rapidly changing. If, for example, deterioration characteristics caused by an image pickup optical system are theoretically axially-symmetrical, it is more preferable to utilize the symmetry to reduce the amount of calculation.

Figure 2E:
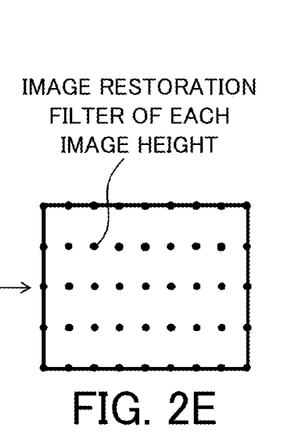

Subsequently, at step S103, the image processing unit corrects the image (the shot image) with the use of the first optical transfer function group specified at step S102 to generate a corrected image. In other words, the image processing unit (a corrected image generating portion 804b) generates the corrected image from the image (the shot image) using the first optical transfer function group. In this processing, the image processing unit corrects the phase characteristics of the image using the first optical transfer function group to generate the corrected image. This series of processing corresponds to the image restoration processing by the Wiener filter. Next, as illustrated in FIG. 2E, the image processing unit designs a Wiener-filter-based image restoration filter (an image restoration filter depending on each representative point position) with the use of the optical transfer function OTF depending on each representative image height (for each representative point position). Then, the image processing unit applies the image restoration processing to the image to correct the shift-variant detrimental characteristics and correct the phase component so as to improve the resolution. The image corrected as such is the corrected image.

The image restoration filter of this embodiment is not limited to the Wiener filter represented by Expression (4). Other type of image restoration filter may also be used if it is equivalent to the Wiener filter represented by Expression (4) designed to convert the weighting for each frequency with respect to the reverse characteristics of the optical transfer functions. In this case, in order to improve the processing speed, it is more preferable that the optical transfer functions (first optical transfer functions) are generated by removing phase terms corresponding to the distortion components or the chromatic aberration of magnification components of the image pickup optical system.

Subsequently, at step S104, the image processing unit performs the blind deconvolution processing for the corrected image generated at step S103. In other words, the image processing unit (an image restoration portion 804c) performs the blind deconvolution processing with the use of the corrected image to generate a restored image. As a result, the resolution can be further improved. Step S104 corresponds to the image restoration processing by the LR method. In the blind deconvolution processing performed in this embodiment, deterioration characteristics created with an arbitrary Gaussian function are used as an initial value $h_0$ (an initial condition) of the deterioration characteristics. In addition, the corrected image generated at step S103 is used as an initial value (an initial condition) of an input image. The variance of the Gaussian function may also be arbitrarily changed.

In this embodiment, the image processing unit (a corrected image generating portion 804b) may also be configured to apply the first optical transfer functions only to partial regions of the image (the shot image) to generate the corrected image corresponding to the partial regions of this image. In this processing, the image restoration portion 804c performs the blind deconvolution processing with the use of the corrected image corresponding to the partial regions of this image to generate the restored image. The image processing method of this embodiment is performed by the image processing apparatus or the image pickup apparatus. This method is also provided as an image processing program which operates on software or hardware.

Embodiment 2

Figure 3:
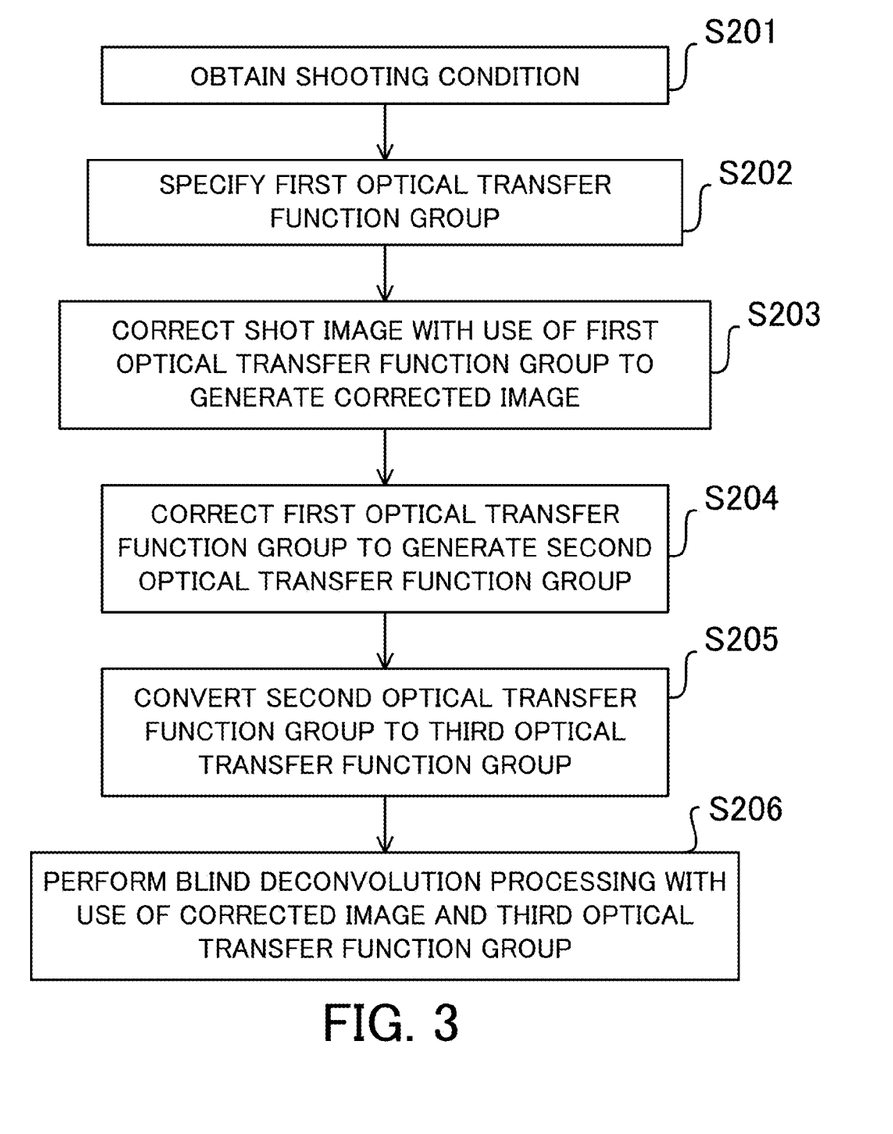
FIG. 3 is a flowchart of an image processing method (image restoration processing) in Embodiment 2.

Next, referring to FIG. 3, an image processing method (image restoration processing) in Embodiment 2 of the present invention will be described. FIG. 3 is a flowchart of the image processing method in this embodiment. Since steps S201 to S203 in FIG. 3 are the same as steps S101 to S103 in FIG. 1, respectively, the description thereof will be omitted.

The image processing unit generates a corrected image with the use of a first optical transfer function group in step S203, and then generates a second optical transfer function group with the use of the first optical transfer function group in step S204. In other words, the image processing unit (a function conversion portion 804d) converts the first optical transfer functions (the first optical transfer function group) to second optical transfer functions (the second optical transfer function group) corresponding to the corrected image. More specifically, the image processing unit obtains the corrected image and then corrects the first optical transfer function group with the use of the Wiener filter derived from the first optical transfer function group itself to generate the second optical transfer function group.

The second optical transfer function group is an optical transfer function group which corrects a phase of the first optical transfer function group (a phase of each of the plurality of first optical transfer functions) to improve a value of frequency characteristics for each frequency. In other words, the second optical transfer functions (the second optical transfer function group) are generated by correcting the phase characteristics of the first optical transfer functions (the first optical transfer function group). The second optical transfer function group may also be obtained by mainly correcting the phase characteristics of the first optical transfer function group. The second optical transfer function group is more shift-invariant compared with the first optical transfer function group.

Figure 4A:
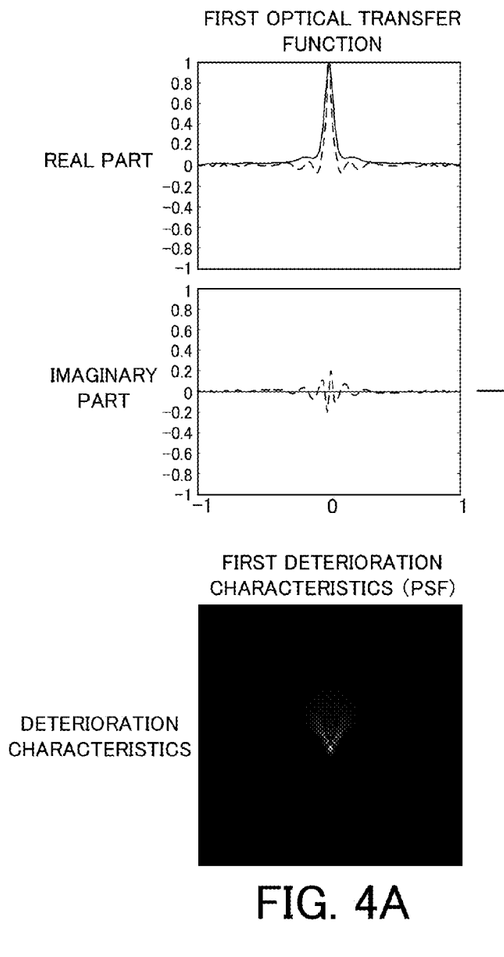
FIGS. 4A and 4B are explanatory diagrams of first optical transfer functions and second optical transfer functions in Embodiment 2, respectively.
Figure 4B:
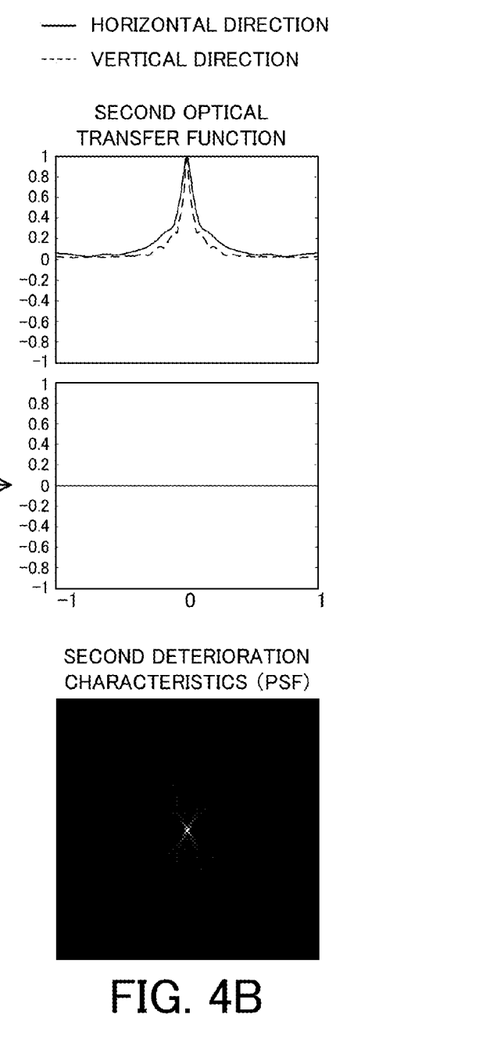

Referring now to FIGS. 4A and 4B, the processing will be described in which the first optical transfer function group is corrected with the use of the first optical transfer function group itself to generated the second optical transfer function group. FIGS. 4A and 4B are explanatory diagrams of the first optical transfer functions and the second optical transfer functions, respectively. The deterioration characteristics of a typical image pickup optical system are such as those indicated by the first optical transfer functions in FIG. 4A. FIG. 4B depicts the second optical transfer functions. In each of FIGS. 4A and 4B, in order from the top, the real part and the imaginary part of the first optical transfer functions or the second optical transfer functions, and the real space profiles (first deterioration characteristics) of the deterioration characteristics (PSF) are illustrated.

The real part and the imaginary part of the first optical transfer functions or the second optical transfer functions are DC components whose center has a frequency of zero. The DC components are standardized with the Nyquist frequencies of the image pickup element. The real part of the first optical transfer functions or the second optical transfer functions indicates a cosine component of the frequency characteristics of first deterioration characteristics or second deterioration characteristics (PSF), and the imaginary part indicates a sine component of the frequency characteristics of the first deterioration characteristics or the second deterioration characteristics (PSF). The phase components of each of the first and second optical functions indicate a ratio of the cosine component and the sine component, which are represented by arc tangent (imaginary part/real part). In this case, the existence of the sine component means that the first optical transfer functions or the second optical transfer functions have an asymmetrical profile in a real space. Therefore, the occurrence of a large amount of sine component in various frequency regions results in an asymmetrical and complicated profile.

If the first optical transfer functions are corrected by the first optical transfer functions themselves with the use of Expression (4), the second optical transfer functions as illustrated in FIG. 4B are obtained. In the case of the second optical transfer functions, the frequency characteristics value of the real part increases while the frequency characteristics value of the imaginary part is 0 in all frequency regions. That is to say, non-existence of the sine component of the deterioration characteristics (PSF) causes the profile to be symmetrical. Consequently, with their asymmetry more greatly improved compared with that of the first optical transfer functions, the second optical transfer functions have shift-invariant characteristics.

Figure 5A:
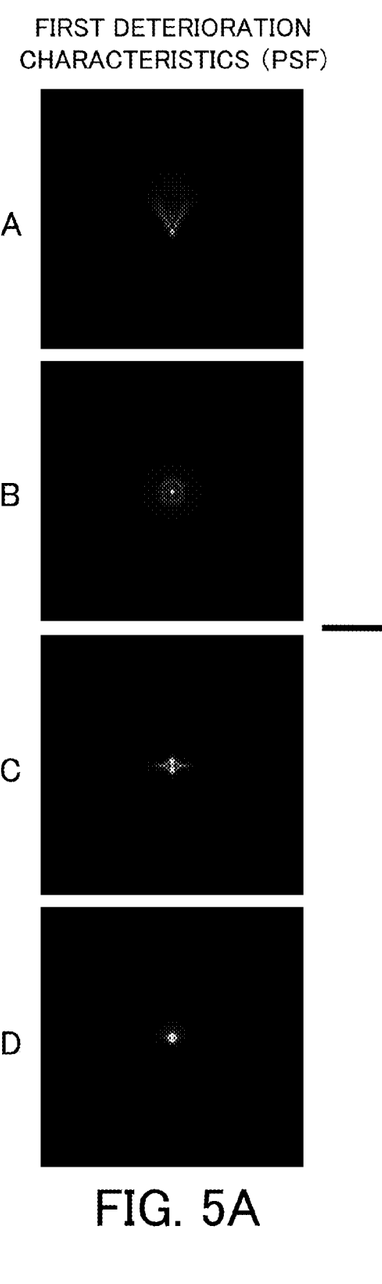
FIGS. 5A and 5B are explanatory diagrams of a first deterioration characteristics group and a second deterioration characteristics group in Embodiment 2, respectively.
Figure 5B:
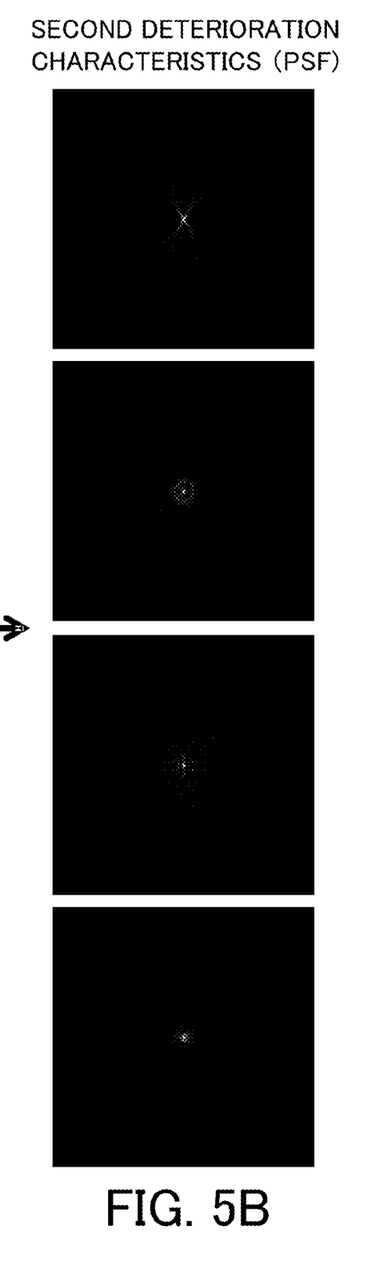

Subsequently, referring to FIGS. 5A and 5B, a description will be given of the deterioration characteristics (PSFs) of the first optical transfer function group and the second optical transfer function group derived through correction of the first optical transfer function group with the use of each of the first optical transfer functions. FIG. 5A is an explanatory diagram of a first deterioration characteristics group corresponding to the first optical transfer function group, and FIG. 5B an explanatory diagram of a second deterioration characteristics group corresponding to the second optical transfer function group. FIG. 5A illustrates the first deterioration characteristics (PSF), and the letters A to D in FIG. 5A indicate the space profiles at each image height position in an image. FIG. 5B illustrates the second deterioration characteristics (PSF) which indicate space profiles obtained by correcting the space profiles illustrated in FIG. 5A with the use of the first optical transfer functions themselves described with reference to FIG. 4A. As described above, the optical transfer function group corresponding to the letters A to D in FIG. 5A is the first optical transfer function group, and that corresponding to the letters A to D in FIG. 5B is the second optical transfer function group.

Subsequently, at step S205 in FIG. 3, the image processing unit converts the second optical transfer function group to a third optical transfer function group. In other words, the image processing unit (a function generating portion 804e) generates third optical transfer functions (the third optical transfer function group) based on the second optical transfer functions (the second optical transfer function group). In this embodiment, the third optical transfer function group is selected as a representative group from the second optical transfer function group. Such a configuration permits further improvement in the resolution of the corrected image without correction with the use of each of the second optical transfer functions. In this embodiment, it is preferable that the number of optical transfer functions contained in the third optical transfer function group is less than that of optical transfer functions contained in the second optical transfer function group. For instance, the third optical transfer functions (the third optical transfer function group) are generated with the use of the weighted average of the second optical transfer functions (the second optical transfer function group) of image regions for which the blind deconvolution processing is performed. Preferably, the third optical transfer functions are generated with a frequency low-pass filter as well. The decrease of the number of the optical transfer function group in such a manner enables the use of newly created optical transfer functions as the third optical transfer function group.

Referring now to FIGS. 6A to 6D, a method will be described in which the image regions whose deterioration characteristics (PSF) are shift-invariant are determined from the second optical transfer function group. FIGS. 6A to 6D are explanatory diagrams of the shift-invariant regions in this embodiment.

Figure 6A:
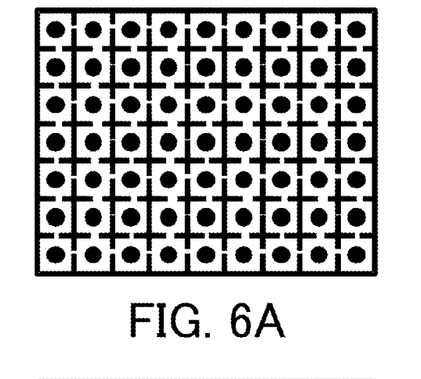
FIGS. 6A to 6D are explanatory diagrams of shift-invariant regions in Embodiment 2.

FIG. 6A illustrates the shift-invariant regions of a shot image. The black points shown in each region indicate optical transfer functions for each region. Since the optical transfer functions are invariant in each region, common optical transfer functions are used in each region. In the case of a typical image pickup optical system (an optical system) included in a digital camera (an image pickup apparatus), each region in which the deterioration characteristics of the optical system are shift-invariant is small. This makes each narrow region in a shot image shift-invariant as illustrated in FIG. 6A.

The image restoration performed by the blind deconvolution processing with the use of the first optical transfer function group in such a state requires multiple processing (repeated processing) in each shift-invariant region. This image restoration entails a number of repeated processing, requiring a very long calculation time. To solve this problem, in this embodiment, the corrected image is generated by correcting the shot image with the use of the first optical transfer function group to enlarge each shift-invariant region. Then, the first optical transfer function group is corrected to the second optical transfer function group with the use of the first optical transfer function group itself. After that, the third optical transfer functions converted from the second optical transfer function group are assigned to each shift-invariant region. At this time, each of the third optical transfer functions to be assigned to each shift-invariant region is obtained through the selection of arbitrary optical transfer functions from the second optical transfer function group in each shift-invariant region. Instead, the third optical transfer functions may also use optical transfer functions obtained by weighting and combining the optical transfer functions of the second optical transfer function group.

Figure 6B:
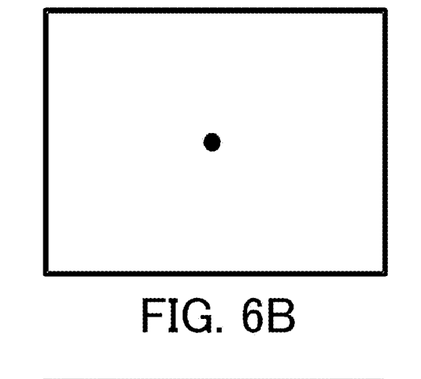

The shift-invariant regions are determined depending on the second optical transfer functions. For instance, if the second optical transfer functions are shift-invariant in all regions of the corrected image, one optical transfer function may be used for all regions of the corrected image as illustrated in FIG. 6B. Such an approach, however, may cause, in the first optical transfer function group, a frequency region which is almost impossible to be restored because, for example, a value of the frequency characteristics is minute. Even if the phase component has been perfectly corrected, a large difference in frequency characteristics may occur in the second optical transfer function group.

Figure 6C:
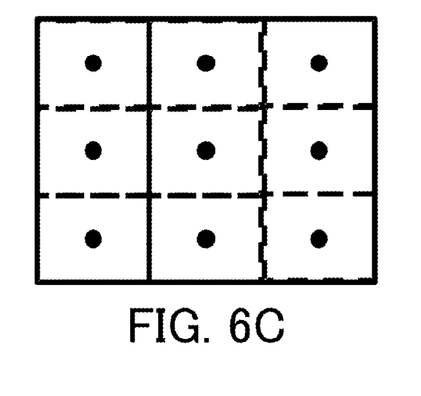
Figure 6D:
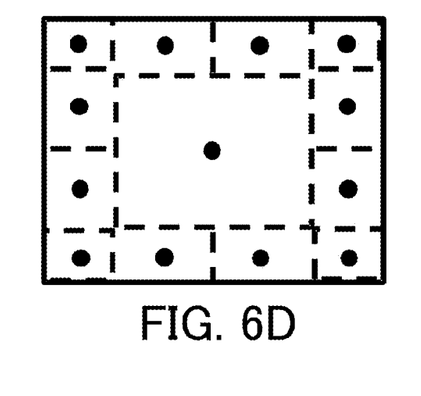

In this case, since it is difficult to deem the entire region of the corrected image to have shift-invariant characteristics, the image region needs to be divided as, for example, illustrated in FIG. 6C or 6D. The image region, however, does not necessarily have to be divided into equal-sized shift-invariant regions. The shift-invariant regions may be determined based on the calculation of the correlation in the optical transfer function group or a simple difference value as an evaluation criterion.

Subsequently, at step S206 in FIG. 3, the image processing unit (the image restoration portion 804c) performs the blind deconvolution processing with the use of the corrected image generated at step S203 and the third optical transfer function group obtained at step S205. The blind deconvolution processing in this embodiment is performed with the alternate use of Expressions (6) and (7). Each of the corrected image and the third optical transfer function group is used as the initial condition of the blind deconvolution processing in this embodiment.

That is to say, the image processing unit performs the blind deconvolution processing for each shift-invariant region of the corrected image which is determined by the method described with reference to FIGS. 6A to 6D, with the use of its corresponding optical transfer function selected from the third optical transfer function group. In this processing, it is more preferable that the optical transfer functions (the first optical transfer functions) are generated by removing the phase terms corresponding to the distortion component or the chromatic aberration of magnification component of the image pickup optical system in order to improve the processing speed. Taking various errors into consideration, each third optical transfer function may also be multiplied by low-pass characteristics before the blind deconvolution processing is performed.

While the processing for the shot image as a whole is described in this embodiment, the processing in this embodiment may also be performed only for predetermined regions of the shot image. Furthermore, in this embodiment, the image processing unit (the image restoration portion 804c) may be configured to perform the blind deconvolution processing with the use of the corrected image and the second optical transfer functions (the second optical transfer function group) generated at step S204, with step S205 being omitted. The image processing method in this embodiment is performed by an image processing apparatus and an image pickup apparatus. This image processing method is also provided as an image processing program which operates on software or hardware.

Embodiment 3

Figure 7:
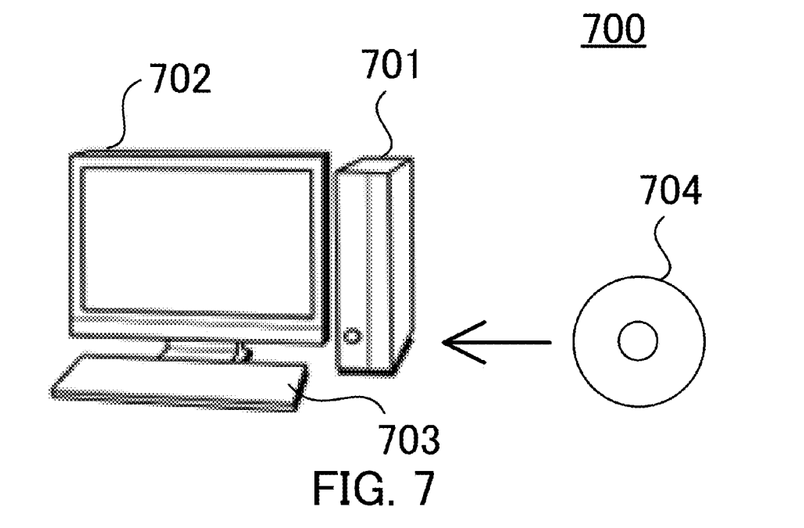
FIG. 7 is a configuration diagram of an image processing system in Embodiment 3.

Next, referring to FIG. 7, an image processing system (an image processing apparatus) in Embodiment 3 of the present invention will be described. FIG. 7 is a configuration diagram of an image processing system 700 in this embodiment. FIG. 7 includes an image processing apparatus 701 (hardware as an information processing apparatus), a display unit 702 (a monitor), and an input device 703 (a keyboard). The image processing apparatus 701 includes a function obtaining portion 804a, a corrected image generating portion 804b, and an image restoration portion 804c, each of which will be described later. The image processing apparatus 701 further includes, as needed, a function conversion portion 804d and a function generating portion 804e. This embodiment describes a case in which the image processing method of Embodiment 1 or 2 operates on the image processing system 700 (personal computer software).

First, in order to cause the image processing method of each of Embodiment 1 and 2 to operate on the image processing apparatus 701, a program (an image processing program) which executes the image processing method is installed in the image processing apparatus 701 (a personal computer). Separately, optical transfer function information is digitalized and then stored in a predetermined folder (a storage unit). The optical transfer function information is all the optical transfer function information for each shooting condition and also a first optical transfer function group for each shooting condition. The image processing program (software which executes the function of each of Embodiments 1 and 2) and the optical transfer function information (data) can be installed from a medium 704 (a storage medium) such as a CD-ROM. Instead, the image processing program and the optical transfer function information may be installed through download via a network (the Internet).

Secondly, the software (the image processing program) installed on the image processing apparatus 701 is started, and then the image processing method (the image restoration processing) of each of Embodiments 1 and 2 are performed for an image (a shot image). On the software, the entire process may finish at the step in which a corrected image is generated or the blind deconvolution processing may be performed to obtain an image with higher resolution. The image processing apparatus 701 may be configured to be able to have a variety of settings such as blind deconvolution processing performed in variable number of repetitions or only for predetermined regions of an image. It is more preferable that the image processing apparatus 701 is configured such that a user can change the setting of each parameter while checking a restored image on the monitor.

Embodiment 4

Figure 8:
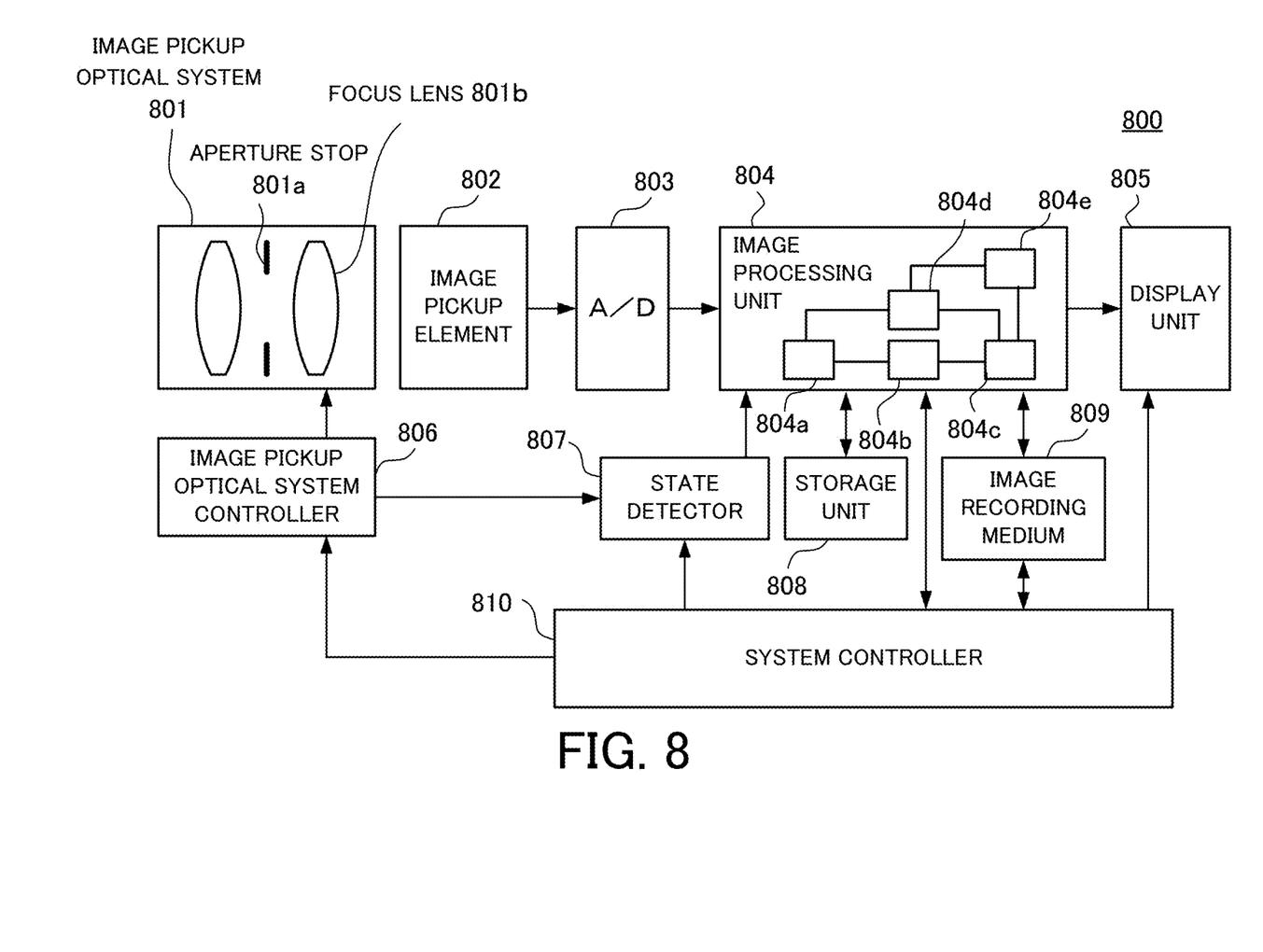
FIG. 8 is a block diagram of an image pickup apparatus in Embodiment 4.

Next, referring to FIG. 8, an image pickup apparatus in Embodiment 4 of the present invention will be described. FIG. 8 is a block diagram of an image pickup apparatus 800 in this embodiment. The image pickup apparatus 800 is an image pickup apparatus to which an image processing apparatus (an image processing unit) that performs the image processing method of each embodiment is integrated.

In the image pickup apparatus 800, an image of an object (not illustrated in the drawing) is formed on an image pickup element 802 via an image pickup optical system 801 which includes an aperture stop 801a (or a light shielding member) and a focus lens 801b. The aperture stop 801a and the light shielding member determine an aperture value. The image pickup element 802 photoelectrically converts the object image formed via the image pickup optical system 801 to obtain a shot image. The shot image (light that forms an image) obtained by the image pickup element 802 is converted to an electrical signal, and then the electrical signal is output to an A/D converter 803. The A/D converter 803 converts the electrical signal (an analog signal) input from the image pickup element 802 to a digital signal, and outputs the digital signal to an image processing unit 804 (image processor).

The image processing unit 804 performs the image restoration processing (the image processing method) of each embodiment in addition to various predetermined processing. First, the image processing unit 804 obtains a shooting condition (shooting condition information) of the image pickup apparatus 800 from a state detector 807. The shooting condition includes, for example, an aperture value (an F number), a shooting distance, and a focal length of a zoom lens. The state detector 807 is capable of obtaining the shooting condition information directly from a system controller 810, or alternatively the state detector 807 can obtain the shooting condition information on the image pickup optical system 801 from the image pickup optical system controller 806. A storage unit 808 stores optical transfer function information (data) for each shooting condition (each of the combination of the focal length, the F number, the shooting distance, and the image height).

The image processing unit 804 includes a function obtaining portion 804a, a corrected image generating portion 804b, and an image restoration portion 804c. The image processing unit 804 further includes, as needed, a function conversion portion 804d and a function generating portion 804e. Each of the function conversion portion 804d and the function generating portion 804e operates as described in Embodiments 1 and 2 to generate the restored image from the shot image.

The output image (the restored image) processed by the image processing unit 804 is recorded in an image recording medium 809 in a predetermined format. The image processed according to this embodiment is subjected to various predetermined processing to be displayed on a display unit 805. Instead, an image may be displayed after being subjected to a simplified processing for high speed display.

A series of control operations in the image pickup apparatus 800 are performed by a system controller 810. The mechanical driving operations are performed by the image pickup optical system controller 806 according to instructions of the system controller 810. The aperture diameter of the aperture stop 801a is controlled as the shooting state setting of the aperture value (the F number). The position of the focus lens 801b is controlled by an auto focus (AF) mechanism or a manual focus mechanism (not illustrated in the drawing) for focusing depending on an object distance.

While the image pickup optical system 801 (a lens apparatus) is integrated with the image pickup apparatus (an image pickup apparatus body) in this embodiment, its configuration is not limited to this. The image pickup optical system 801 may also be an interchangeable lens that is removably attached to the image pickup apparatus body such as a single lens reflex camera.

In this embodiment, the image processing unit 804 specifies an optical transfer function group corresponding to the obtained shooting condition, and then corrects the shot image to generate the corrected image. The corrected image so generated is stored in the storage unit 808. The image processing unit 804 reads first image data from the storage unit 808 to perform the blind deconvolution processing.

A user may either finish his/her operation at the step in which the corrected image is generated or perform the blind deconvolution processing to obtain an image with higher resolution. Alternatively, a user may use the image processing apparatus 701 or the image pickup apparatus 800 configured to be able to have a variety of settings such as blind deconvolution processing performed in variable number of repetitions or only for predetermined regions of an image. It is more preferable that the image processing apparatus 701 or the image pickup apparatus 800 is configured such that a user can change the settings of each parameter while checking the restored image on the monitor.

The image processing apparatus and the image pickup apparatus of each of the embodiments described above are capable of satisfactorily correcting an image with shift-variant deterioration characteristics and reconstructing information lost due to deterioration. Therefore, each embodiment can provide an image processing apparatus, an image pickup apparatus, an image processing method, an image processing program, and a storage medium which are capable of satisfactorily correcting a frequency region whose information is lost due to deterioration characteristics.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the first optical transfer function group including only one optical transfer function (a first optical transfer function) may also be applied to each of the embodiments. Similarly, the second and third optical transfer function groups each of which includes only one optical transfer function (a second optical transfer function and a third optical transfer function) may be applied to each of the embodiments.

This application claims the benefit of Japanese Patent Application No. 2013-013226, filed on Jan. 28, 2013, which is hereby incorporated by reference herein in its entirety.

What is claimed is:

1. An image processing apparatus comprising an image processor configured to:
  obtain a first optical transfer function which is different depending on a shooting condition and on a position in an image;
  generate a corrected image from the image using the first optical transfer function, the corrected image including a shift-invariant region larger than a shift-invariant region of the image;
  convert the first optical transfer function to a second optical transfer function corresponding to the corrected image; and
  perform blind deconvolution processing using the corrected image and the second optical transfer function to generate a restored image,
  wherein the second optical transfer function has a shift-invariant characteristic compared with the first optical transfer function.

2. The image processing apparatus according to claim 1, the image processor further configured to:
  generate a third optical transfer function from the second optical transfer function,
  wherein the image processor is configured to perform the blind deconvolution processing using the corrected image and the third optical transfer function.

3. The image processing apparatus according to claim 2, wherein the image processor is configured to perform the blind deconvolution processing using the third optical transfer function as an initial condition.

4. The image processing apparatus according to claim 2, wherein the third optical transfer function is generated using a weighted average of the second optical transfer functions of an image region for which the blind deconvolution processing is to be performed.

5. The image processing apparatus according to claim 4, wherein the third optical transfer function is generated using a frequency low-pass filter.

6. The image processing apparatus according to claim 1, wherein the image processor is configured to perform the blind deconvolution processing using the corrected image as an initial condition.

7. The image processing apparatus according to claim 1, wherein the first optical transfer function is generated by removing a distortion component and a chromatic aberration of magnification component.

8. The image processing apparatus according to claim 1, wherein the image processor is configured to correct phase characteristics of the image using the first optical transfer function to generate the corrected image.

9. The image processing apparatus according to claim 1, wherein the image processor is configured to apply the first optical transfer function only to a partial region of the image to generate a corrected image corresponding to the partial region of the image, and
  wherein the image processor is configured to perform the blind deconvolution processing using the corrected image corresponding to the partial region of the image to generate the restored image.

10. An image pickup apparatus comprising:
  an image pickup element configured to photoelectrically convert an object image via an image pickup optical system; and
  an image processor configured to:
    obtain a first optical transfer function which is different depending on a shooting condition and on a position in an image,
    generate a corrected image from the image using the first optical transfer function, the corrected image including a shift-invariant region larger than a shift-invariant region of the image,
    convert the first optical transfer function to a second optical transfer function corresponding to the corrected image, and
    perform blind deconvolution processing using the corrected image and the second optical transfer function to generate a restored image,
  wherein the second optical transfer function has a shift-invariant characteristic compared with the first optical transfer function.

11. A method of processing an image, the method comprising the steps of:
  obtaining a first optical transfer function which is different depending on a shooting condition and on a position in an image;
  generating a corrected image from the image using the first optical transfer function, the corrected image including a shift-invariant region larger than a shift-invariant region of the image;

converting the first optical transfer function to a second optical transfer function corresponding to the corrected image; and performing blind deconvolution processing using the corrected image and the second optical transfer function to generate a restored image, wherein the second optical transfer function has a shift-invariant characteristic compared with the first optical transfer function.

12. A non-transitory computer-readable storage medium storing a program configured to cause an information processing apparatus to execute the steps of:

obtaining a first optical transfer function which is different depending on a shooting condition and on a position in an image;

generating a corrected image from the image using the first optical transfer function, the corrected image including a shift-invariant region larger than a shift-invariant region of the image;

converting the first optical transfer function to a second optical transfer function corresponding to the corrected image; and performing blind deconvolution processing using the corrected image and the second optical transfer function to generate a restored image, wherein the second optical transfer function has a shift-invariant characteristic compared with the first optical transfer function.

* * * * *